March 31, 1925. Re. 16,035

T. I. TEMPLE ET AL

SIGNAL

Original Filed Oct. 21, 1922

INVENTORS.
THOMAS I. TEMPLE.
ELIZABETH A. TEMPLE.

BY

ATTORNEYS.

Reissued Mar. 31, 1925. Re. 16,035

UNITED STATES PATENT OFFICE.

THOMAS I. TEMPLE AND ELIZABETH A. TEMPLE, OF INDIANAPOLIS, INDIANA.

SIGNAL.

Original No. 1,468,763, dated September 25, 1923, Serial No. 595,967, filed October 21, 1922. Application for reissue filed October 24, 1924. Serial No. 745,702.

*To all whom it may concern:*

Be it known that we, THOMAS I. TEMPLE and ELIZABETH A. TEMPLE, citizens of the United States of America, residing at No. 522 Massachusetts Avenue, in the city of Indianapolis, county of Marion, and State of Indiana, have invented a new and useful Signal, of which the following is a specification.

Our invention relates to improvements in signalling devices of that type of construction which is adapted to be positioned in or adjacent to a roadway or like place to give warning to persons traversing the roadway of the presence of an adjacent source of possible danger or place of interest to such persons, and it consists in the combinations, constructions and arrangements herein described and claimed.

An object of our invention is to provide a signal of the character described, which is adapted to be positioned on the surface of the roadway so that its presence cannot be overlooked by persons traversing the roadway, and which in applied position, does not obstruct or hinder in any way the passage of vehicles thereover.

A further object of our invention is to provide a device of the character described which comprises signal giving elements of a reflecting nature which are adapted to catch and reflect the object illuminated by rays of sun-light or rays of light from an approaching lighted vehicle.

A still further object of our invention is to provide a device of the character described in which the signal giving elements may be varied to suit varying conditions of light or to give various signals to direct the further operation of approaching vehicles.

A still further object of our invention is to provide a device of the character described which is of simplified construction, is not likely to get out of order easily or wear out quickly in service, and which is thoroughly practical commercially.

Other objects and advantages will be apparent from the following description considered in conjunction with the accompanying drawing forming part of this application, in which:—

Figure 1:
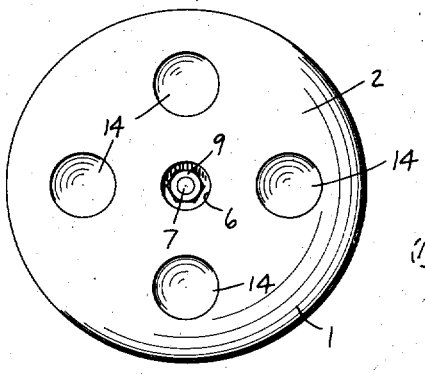
Figure 1 is a plan view of one form of signal embodying our invention.

In carrying out our invention, we provide a supporting holder or base 1 which may be formed of any suitable material and in any suitable known manner, preferably being cast in one piece and being made of an opaque wear and rust resisting metal. The supporting holder or base 1 has a convex upper surface designated 2, which is merged at its edge into a substantially flat lower face 3, which is adapted to rest in contiguous relation at all points to a flat supporting surface 4 which may be a portion of pavement or like roadway. The holder or base 1 is formed with an axial or central vertical bore 5 extending therethrough and being counter-bored or enlarged diametrically at its upper end as indicated at 6. An anchoring member 7, which may be an upright pin having a split or relatively enlarged lower end portion, such as indicated at 8, fixedly held below the supporting surface 4, extends vertically through the bore 5 and projects into the counter-bore 6, being there engaged with a retaining member such as the nut 9 and the holder or base 1 thus clamped firmly to the supporting surface 4. It will be observed that the nut 9 and the upper end of the anchoring member 7 are countersunk in respect to the upper face of the holder or base being entirely disposed within the counter-bore 6.

In order to prevent movement of the base or holder 1 relatively to the anchoring member 7 and to the supporting surface 4, and to obviate strain upon the anchoring member, the base or holder 1 may have lugs or projections 10 pendant from the lower face thereof and interfitting sockets or recesses 11 in the supporting surface 4.

It will thus be apparent that the base or holder 1 will be securely and removably clamped to the surface 4 so that the exposed face thereof is regularly curved and offers no obstruction to the passage of a vehicle thereover.

The holder or base 1 is provided at a plurality of points with seats or sockets 12 opening through the convexly curved upper face 2 and being adapted to receive signal giving elements. In the form of the device shown in Fig. 1, the seats 12 are circular in cross sectional contour and have rounded or convexly curved bottoms, being thus adapted to receive a signal giving element having a body 13 of circular cross sectional contour and preferably being formed with a concave upper face 14 and with a convexly curved lower end 15. The body 13 may be made of glass or other transparent or translucent material and may be colored to render it conspicuous when rays of sunlight or rays of light from an approaching vehicle are caught thereby. For example, the body 13 may be colored red to give warning to interested persons of the proximity of a source of danger. The body 13 may be transparent and may be provided with a coating of quick silver on the lower and side walls thereof to render it highly efficient in reflecting rays of light. It will be understood that the body in the form described will be an efficient reflector.

Figure 5:
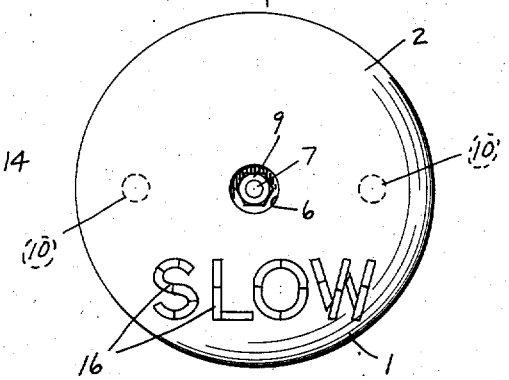
Figure 5 is a plan view showing another form of signal embodying the same invention.
Figure 2:
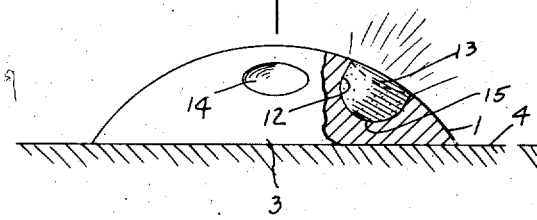
Figure 2 is a view showing the signal exhibited in Figure 1 in applied position on a roadway, the latter being shown in section and the signal being shown mainly in side elevation, portions thereof being broken away and shown in section.
Figure 6:
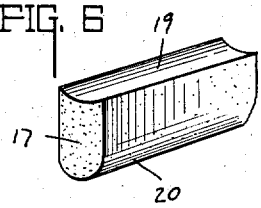
Figures 6 and 7 are relatively enlarged perspective views showing sections of signal giving elements adapted to be comprised in the form of device shown in Figure 5.
Figure 7:
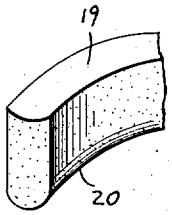

As shown in Fig. 5, the seats in the holder or base which open through the upper face thereof may be adapted to receive signal giving elements 16 in the form of letters and may be relatively arranged so that the letters held therein comprise words conveying warning to interested persons or directing the further movements of approaching travelers. Each of the letters 16 may be made up of sections, such as indicated at 17 and 18, respectively, in Figs. 6 and 7. Each section is made of a transparent or translucent substance, such as clear or colored glass, and each section is formed with the upper face thereof concavely curved in cross sectional contour as indicated at 19 and with the lower face thereof convexly curved in cross sectional contour as indicated at 20. If each section is made of a transparent material, the lower and vertical walls thereof may be coated with quick silver or the like substance to augment the reflecting properties of the sections.

Figure 4:
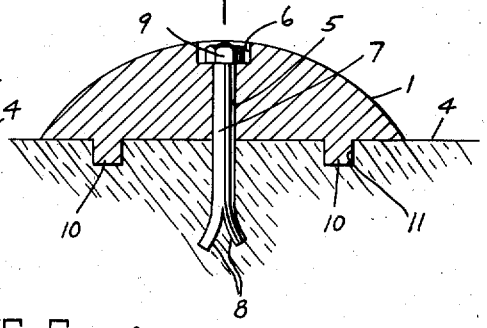
Figure 4 is a vertical sectional view showing the means comprised in the device for anchoring the signal to a roadway.
Figure 3:
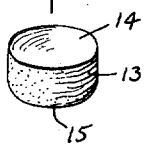
Figure 3 is a perspective view of a signal giving element adapted to be comprised in the form of the device exhibited in the preceding views.

The seats in the upper surface of the form of the device shown in Figure 4 are such as to receive sections comprising the word "Slow," but it will be understood that any desirable words or signal giving indicia may be presented.

From the foregoing description of the various parts of the device the operation thereof may be readily understood. Since the holder or base is positioned directly in the path of persons traversing a roadway, the signals given thereby cannot be overlooked and a device embodying our invention is, therefore, highly efficient for the purpose for which intended. The signal giving elements may be replaced or interchanged as desired in order that various signals may be given or in order that signal giving elements appropriate for use under various conditions may be employed as required.

Obviously our invention is susceptible of embodiment in forms other than those illustrated in the accompanying drawing and we, therefore, consider as our own all modifications and adaptations thereof which fairly fall within the scope of the appended claims.

The invention claimed is:

1. A signal of the character described comprising an opaque holder having a flat lower face and a convex upper face curved from its center to its outer edge, said lower face and said upper face being merged one into the other at their outer edges, said holder having a plurality of seats opening through the upper face thereof at points intermediate the center and the outer edge of said upper face, and a light reflecting signal element interfitting each seat, the outer face of said light reflecting signal element being curved.

2. A signal of the character described comprising an opaque holder having a flat lower face and a convex upper face curved from its center to its outer edge, said lower face and said upper face being merged one into the other at their outer edges, said holder having a plurality of seats opening through the upper face thereof at points intermediate the center and the outer edge of said upper face, and a light reflecting signal element interfitting each seat, the outer face of said light reflecting signal element being curved, and being substantially flush at its outer edge with the edge of the seat.

In witness whereof, we have hereunto affixed our signatures.

THOMAS I. TEMPLE.
ELIZABETH A. TEMPLE.